(12) United States Patent
Miller

(10) Patent No.: US 8,151,564 B2
(45) Date of Patent: Apr. 10, 2012

(54) FUEL EFFICIENT HYDRAULIC POWER STEERING

(75) Inventor: Todd Robert Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 12/821,864

(22) Filed: Jun. 23, 2010

(65) Prior Publication Data

US 2010/0257855 A1    Oct. 14, 2010

Related U.S. Application Data

(63) Continuation of application No. 11/947,951, filed on Nov. 30, 2007, now Pat. No. 7,743,610.

(51) Int. Cl.
    *B62D 5/065* (2006.01)
    *F04B 49/00* (2006.01)

(52) U.S. Cl. .......................... 60/418; 180/421
(58) Field of Classification Search .................... 60/417, 60/418; 180/421
    See application file for complete search history.

(56) References Cited

U.S. PATENT DOCUMENTS

| | | | |
|---|---|---|---|
| 4,068,477 A | 1/1978 | Lefebvre | |
| 4,457,390 A | 7/1984 | Abe et al. | |
| 4,643,269 A | 2/1987 | Arciero et al. | |
| 5,209,317 A * | 5/1993 | Schnelle | 60/413 |
| 5,564,516 A | 10/1996 | Nimblett, Jr. et al. | |
| 5,921,342 A * | 7/1999 | Maruyama et al. | 60/418 |
| 6,513,618 B1 | 2/2003 | Wolters | |
| 6,920,753 B2 | 7/2005 | Namuduri | |
| 6,945,352 B2 | 9/2005 | Phillips | |
| 6,988,581 B2 | 1/2006 | Croughs et al. | |
| 7,055,643 B2 | 6/2006 | Williams et al. | |
| 7,055,644 B2 | 6/2006 | Merz | |
| 7,743,610 B2 | 6/2010 | Miller | |
| 2003/0127275 A1 | 7/2003 | Rogers et al. | |

* cited by examiner

*Primary Examiner* — Thomas E Lazo
(74) *Attorney, Agent, or Firm* — Nugent & Smith, LLP; Robert Hess; Theres O'Rourke Nugent

(57) ABSTRACT

A hydraulic power steering system that maintains proportional pressure control between an input side of a gear and assist pressures internal to the steering gear by relying upon a control valve. A pressure differential is maintained between the input side of a gear and assist pressures internal to the steering gear throughout certain events. Those events include running the pump to fully charge the accumulator, idling the pump after fully charging the accumulator, discharging pressure from the fully charged accumulator at an onset of a steering event having a demand for steering load, recovering the discharged pressure of the accumulator by running the pump after turning on the pump at the onset of the steering event, and opening the relief valve in the valve manifold during the steering event.

26 Claims, 17 Drawing Sheets

FUEL EFFICIENT HYDRAULIC POWER STEERING

BACKGROUND OF THE INVENTION

1. Field of the Invention

The invention relates to a hydraulic power steering system that continuously provides a source for hydraulic assist to a steering gear while allowing the pump to be idled when there is no steering demand to reduce energy consumption.

2. Description of Related Art

Conventional hydraulic power assist steering systems employ an open center valve at the steering gear and a pump, which supplies constant flow through an open loop hydraulic circuit. Fluid is pumped through the system at all times while the engine is running regardless of steering load. By closing ports within the steering valve creating pressure internal to the gear and in the hydraulic circuit upstream to the pump, boost or steering assist is created. Running a hydraulic pump continuously in this type of system ensures good response to a steering input but is inefficient when there is no steering load. Restrictions in the hydraulic system can create significant backpressure against the pump, which over time generate a significant amount of heat that must be managed with oil coolers. As a result, prior studies have shown that fuel consumption in the unloaded mode can dominate the fuel consumed under load.

U.S. Pat. No. 5,921,342 (the '342 patent) provides a Power Assisted Steering Apparatus for Automotive Vehicle, but does not have a proportional pressure relief for the pump under load but instead relies on throttling down flow through the system using a variable displacement pump when steering demand is low. Since flow is proportional to pressure drop across restrictions in the hydraulic system, the backpressure that the pump needs to work against is lower when flow is reduced through the system in low steering demand situations. Therefore, this system reduces pumping losses and saves energy over hydraulic power steering systems that employ fixed displacement hydraulic pumps.

The patent application publication to Rogers et al. (2003/0127275 A1) provides for a High Efficiency Automotive Hydraulic Power Steering System, but it does not maintain proportional pressure control between its input side of its gear and the assist pressures internal to the gear, which is a key enabler for being able to control steering assist as a function of steering valve opening hydraulically without the need for electronic controls. However, it does have an automotive hydraulic power steering system 10 that prevents wasted energy when no power assist is required. The accumulator pressure is set to the minimum pressure for the worst case steering demand, but such a setting increases the risk of leakage in the steering and safety systems whose minimum pressure is smaller than such a minimum pressure for the worst case scenario. It is desirable to use a load sensing signal from the shuttle valve to provide the proportional pressure control function.

SUMMARY OF THE INVENTION

One aspect of the invention resides in the design of a power steering hydraulic system that includes an engine driven power steering pump equipped with a clutch, a steering gear with a closed center control valve, a piston type accumulator, a valve control manifold, a two pressure switches. The valve manifold provides pressure to the input side of the closed center steering valve that is proportional to the assist pressure internal to the gear so that the level of assist is both predictable and consistent as a function of steering valve opening. A shuttle valve is used in conjunction with a pressure switch as the steering load sensing device. The accumulator is used as a storage device to permit the pump to be idled when there is no steering load and also to provide un-interrupted assist to the gear during pump clutch engagement at the onset of a steering event.

The inventor established the following design scheme in developing of the invention with the objective of maximizing energy efficiency of hydraulic power steering systems—particularly those with higher steering load requirements.

Utilize the existing power source to drive the steering pump—adding a separate power source (typically an electric motor) for power steering has clear advantages as it can be optimized for the application—Electric Power Steering (EPS) and Electro-Hydraulic Power Steering (EHPAS) are typical examples. However, the size and cost of electric motors needed for higher steering load applications make these systems undesirable or impractical at this point in time.

Turn off the pump when there is no steering load—As stated earlier, prior studies have shown that fuel consumption in the unloaded mode can dominate the fuel consumed under load. Therefore, this is a key to minimizing fuel consumption.

Use a closed center steering valve to eliminate fluid flow through the system when there is no steering load. Conventional open center valves require constant flow at all times. A closed center valve allows fluid to be stored upstream in the system and delivered to the gear on demand.

Add an accumulator to manage steering load/unload transitions. This enables initial steering assist (and/or brake assist if equipped with hydra boost) while the pump is being engaged at the onset of a steering (and/or braking) event. Prior studies with clutched pumps without accumulators have shown unacceptable response. The closed center steering valve provides flow on demand and in proportion to steering wheel rate rather than continuous flow, which minimizes accumulator size.

Use pressure internal to the gear and a switch as the steering load signal. Load sensing with a closed center steering valve can also be accomplished by sensing pressure drop across an orifice in the supply line to the gear or with a steering angle sensor on the gear input shaft. However, both load sensing signals have limitations. The pressure drop across an orifice can be difficult to measure when steering wheel rates (and consequently flow to the gear) are low but steering load and need for assist are high. Steering angle alone does not always correlate well to steering load and often require other inputs, signal processing and calibration complications.

Use proportional hydraulic valve controls to control assist and pump flow. Proportional control allows supply and demand to balance hydraulically without the need for complicated and costly electronic control strategies.

BRIEF DESCRIPTION OF THE DRAWING

For a better understanding of the present invention, reference is made to the following description and accompanying drawing, while the scope of the invention is set forth in the appended claims.

DETAILED DESCRIPTION OF THE INVENTION

Figure 1:
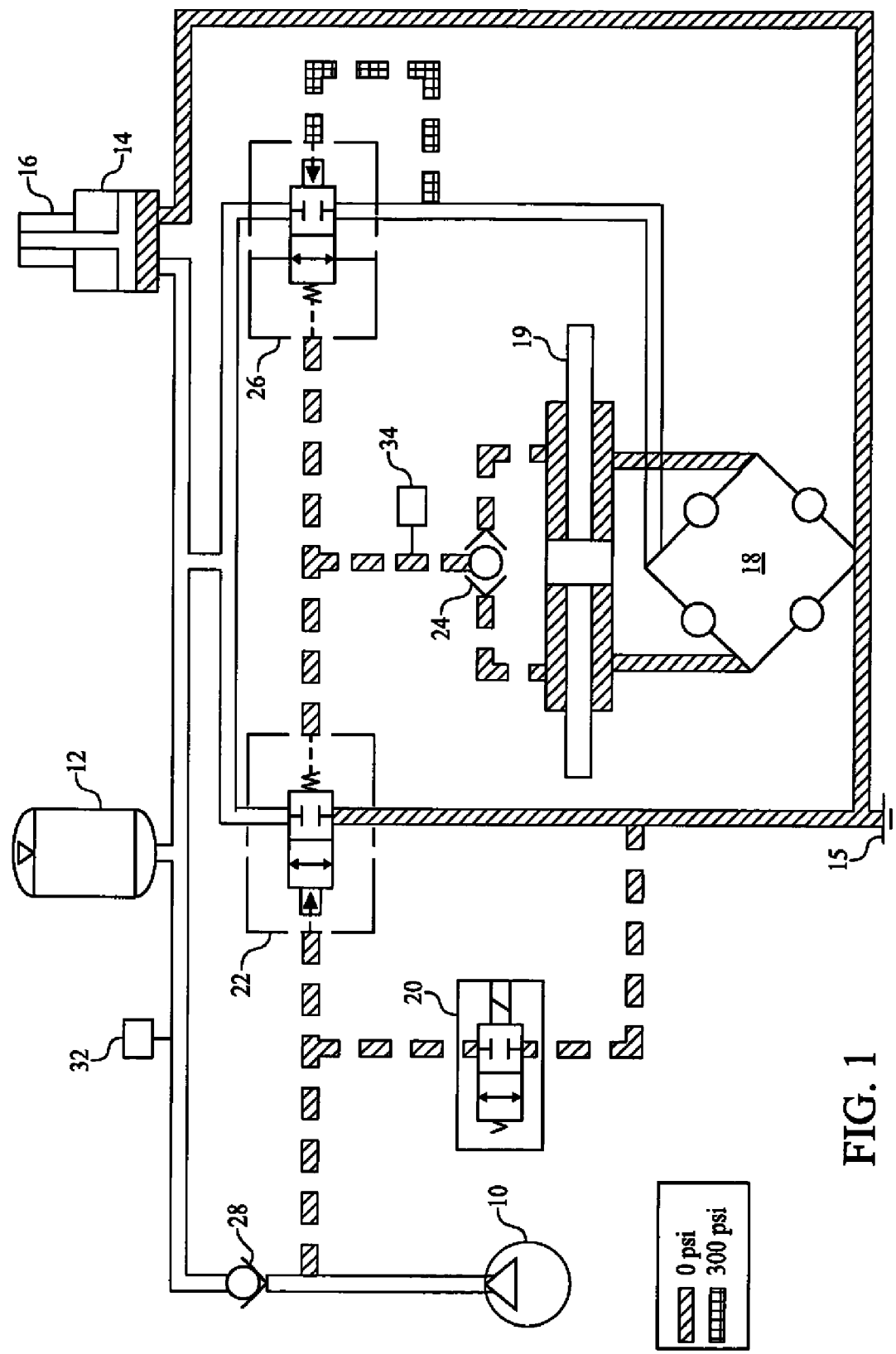
FIG. 1 shows the hydraulic circuit diagram in accordance with an embodiment of the invention, at the start of the accumulator charge cycle with no steering load.

FIGS. 1-10 share the following components in the hydraulic power steering system: a pump/clutch assembly 10, an accumulator 12, a brake hydra boost 14 with brake master cylinder 16, a steering gear 19, a solenoid valve 20 that is normally open, a relief valve 22 that is normally closed, a closed centered, (gear valve or) steering valve 18, a shuttle valve 24, a control valve 26 that is normally open, a check valve 28 downstream of the pump/clutch assembly 10, a pressure switch 32 in the accumulator circuit, a pressure switch 34 in the reference pressure circuit downstream of shuttle valve 24.

The clutch of the pump/clutch assembly 10 engages the pump when there is a steering demand or accumulator needs to be charged. Shuttle valve 24 monitors pressure on each side of the piston in steering gear 19 and provide the higher of the two pressures to the reference pressure circuit. Accumulator 12 is used to store power steering fluid under pressure. Flow from accumulator 12 allows control valve 26 to provide fluid initial pressure/flow to steering gear 19 through steering valve 18 to prevent a response lag because of time delay from engagement of the pump/clutch 10 during a steering event until the pump runs at applicable capacity.

Solenoid valve 20 (normally open) allows relief valve 22 to close more rapidly when the clutch disengages after an accumulator charge. The solenoid in solenoid valve 20 energizes and closes the valve when the pump is engaged blocking flow to the reservoir and allowing pump pressure to be sensed by relief valve 22. The solenoid in solenoid valve 20 de-energizes and opens the valve when the pump is disengaged allowing flow through solenoid valve 20 to reservoir 15. This allows pressure to relief valve 22 to be vented to atmosphere driving the valve closed immediately after the pump clutch is disengaged since relief valve 22 is normally closed.

Relief valve 22 is normally closed and begins to open when pump supply pressure exceeds the pressure required to overcome the spring setting internal to relief valve 22 plus a secondary opposing pressure from the opposite end of relief valve 22 which is ported to the reference pressure circuit. A unique feature of relief valve 22 is that the area of the internal spool valve that is exposed to reference pressure is 30% smaller than the area of the spool valve that is exposed to the pump supply pressure. This configuration reduces the contribution of reference pressure on the spool and allows relief valve 22 to begin relieving some of the flow to the pump back to reservoir 15 as reference pressure increases to better balance pump supply with demand as determined by reference pressure. This valve design keeps the pump from going into relief prematurely in moderate to high steering load conditions. The operation of relief valve 22 is shown graphically in FIG. 14.

Schematic diagrams of the on-demand hydraulic power steering system in accordance with an embodiment of the invention are shown in FIGS. 1-10, each at different operating conditions.

FIG. 1 shows the hydraulic circuit diagram at the start of the accumulator charging cycle when there is no steering load (or brake load if the application includes hydra boost braking system). The pressure in accumulator 12 has been dropping due to small but expected leakage through steering valve 18, which is currently closed and on center (i.e., no steering input by the driver).

In this example, pressure switch 32 is designed to close when pressure in the accumulator drops below the switch setting. In this example, switch 32 has just closed providing power to pump clutch 10 and solenoid valve 20. Power to the normally open solenoid valve 20 closes the valve. As the pump clutch 10 engages, flow from the pump opens check valve 28 and begins to fill accumulator 12 while pressure builds in the accumulator circuit. Shuttle valve 24 is idle since there is no steering input from the driver and is supplying zero pressure to the reference pressure circuit. At this point, relief valve 22 is closed.

As pressure builds in the pump supply and accumulator circuits, relief valve 22 remains closed allowing all pump flow to charge accumulator 12. The purpose of control valve 26 is to maintain proportional pressure control between the input side of the gear and reference pressure. In this example, control valve 26 is set to continuously maintain a pressure to the input side of the gear equal to 300 psi above reference pressure, which is the valves spring setting. The operation of control valve 26 is shown graphically in FIG. 13.

Figure 2:
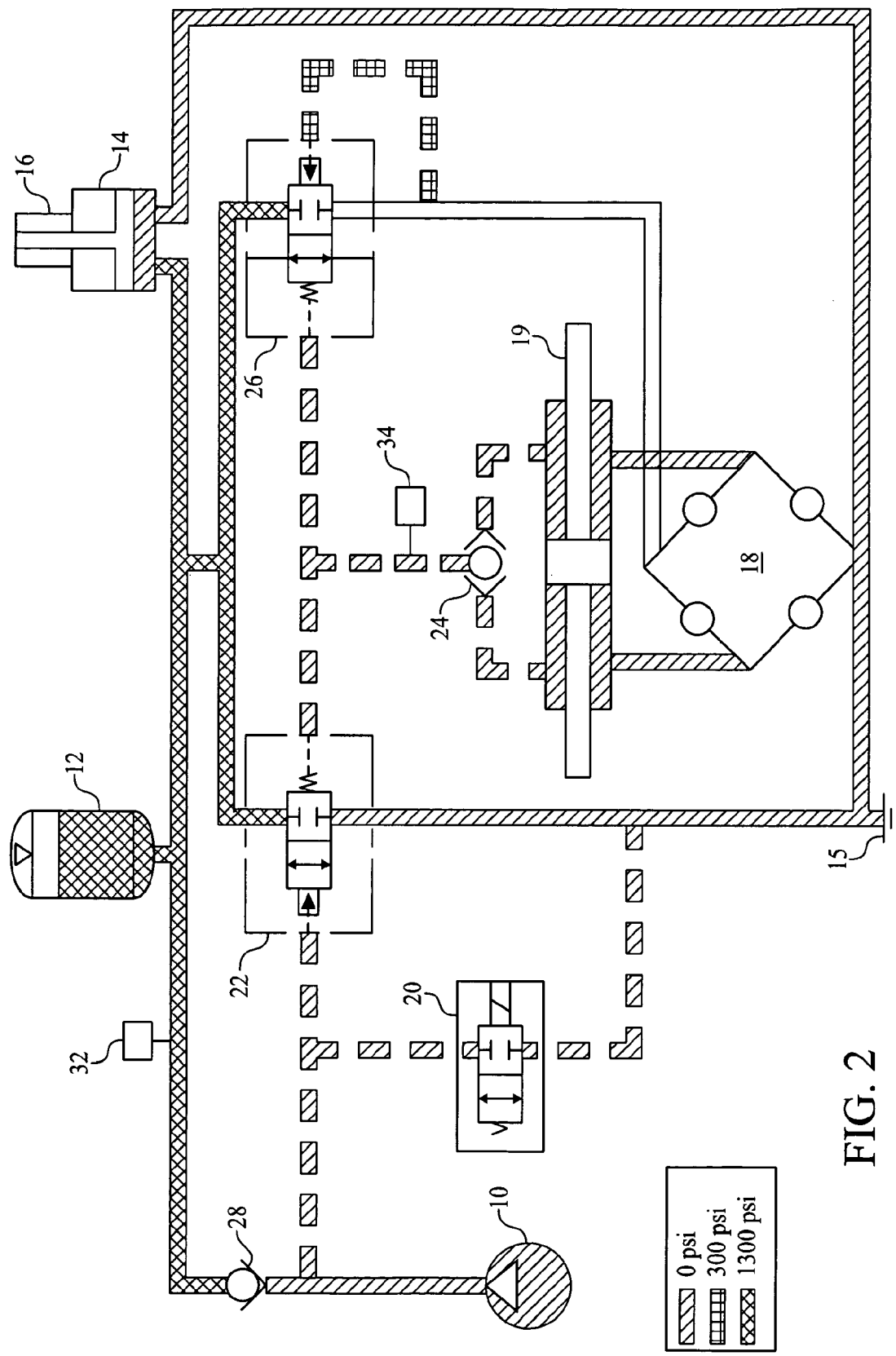
FIG. 2 shows the hydraulic circuit diagram in accordance with an embodiment of the invention, reflecting the end of the accumulator charge cycle with no steering load.

FIG. 2 shows the hydraulic circuit diagram of the same embodiment reflecting the end of the accumulator charging cycle when there is no steering load (or brake load if application includes hydra boost). The pressure in accumulator 12 has been rising with the pump clutch 10 engaged.

In this example, pressure in the accumulator circuit has reached the maximum accumulator charge pressure and triggered the pressure switch 32 to open which turns off electrical power to the clutch on the pump and solenoid valve 20. In addition, relief valve 22 also starts to open since it is set to open when pump supply pressure reaches the maximum accumulator charging pressure (The reference pressure contribution in this case is zero since there is no steering load).

As pump clutch 10 disengages, flow from the pump stops, solenoid valve 20 opens, check valve 28 closes to prevent back flow and pressure immediately upstream of the check valve 28 is released to a vented reservoir 15. Opening solenoid valve 20 allows pump supply reference pressure to relief valve 22 to drop and the valve to close immediately to prevent fluid and pressure loss from the accumulator circuit. Although pressure in the accumulator circuit is now at maximum charging pressure, control valve 26 continues to maintain a set pressure (ex. 300 psi) to the input side of the steering valve 18, which is still closed and on center. Keeping the pressure low to steering valve 18 minimizes leakage through the valve, maximizes the time between accumulator charges and subsequently maximizes fuel efficiency.

Figure 3:
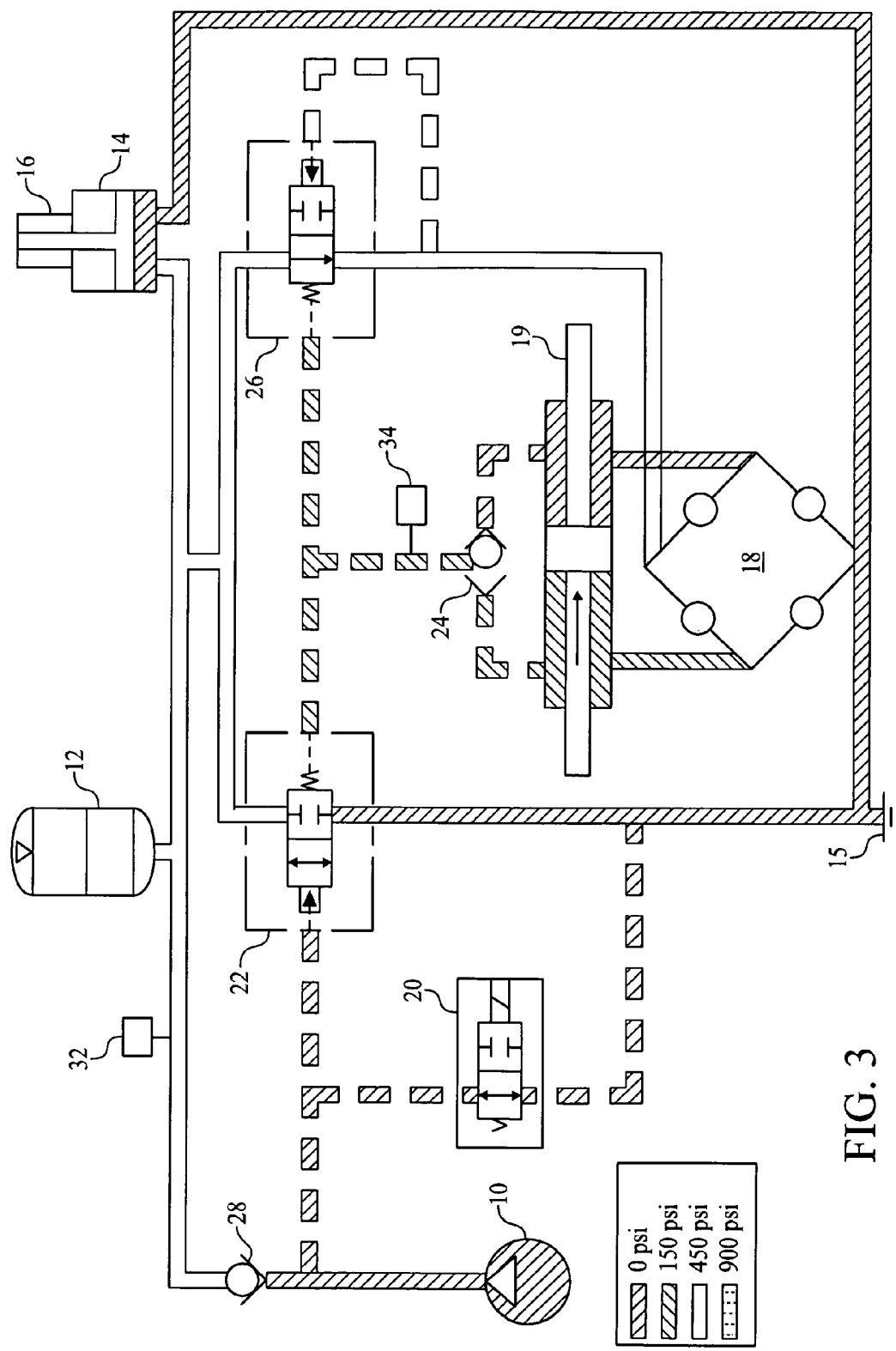
FIG. 3 shows the hydraulic circuit diagram in accordance with an embodiment of the invention, reflecting the onset of a light steering event.

FIG. 3 shows a hydraulic circuit diagram of the same embodiment reflecting when a light steering event begins. When the driver turns the steering wheel, the column shaft, the intermediate shaft between column and steering gear 19 turn as well (not shown). If the torque applied to the steering wheel is sufficient to overcome the torsion rate of a small steel bar (often referred to as a T-bar) hard mounted between the gear input shaft and valve sleeve, the steering valve 18 will begin to open. In FIG. 3, the light steering event is represented, i.e., by showing higher pressure on one side of steering gear 19 as steering valve 18 begins to open.

The pressure internal to the left side of the steering gear 19 has increased (ex. 150 psi) and that the ball in shuttle valve 24 has been forced to the right blocking flow to the other side of the gear. Shuttle valve 24 then feeds the full pressure internal to the left side of the steering gear to the reference pressure circuit. Since the piston inside gear 19 is tied directly to the vehicle road wheels through tie rods (not shown), the piston begins to move right in this case to turn the wheels.

As the piston moves to the right inside the gear housing, control valve 26 must provide flow through steering valve 18 to fill the increasing volume to the left of the gear piston and maintain proportional pressure control between the input side of the steering valve 18 and the reference pressure. The control valve 26 has increased supply pressure to the steering valve 18 (ex. 450 psi) to maintain the preset differential pressure (ex. 300 psi) above reference pressure (ex. 150 psi). The accumulator 12 supplies flow passing through control valve 26 to the steering gear 19 and consequently the accumulator pressure drops (ex. 900 psi). The pressure in the accumulator circuit is between minimum and maximum accumulator charging levels so pressure switch 32 remains open so there is no power to the pump clutch. The reference pressure (ex. 250 psi) is below the trigger point for pressure switch 34 (ex. 300 psi), so the switch 34 remains open as well so the clutch to the pump is disengaged.

Figure 4:
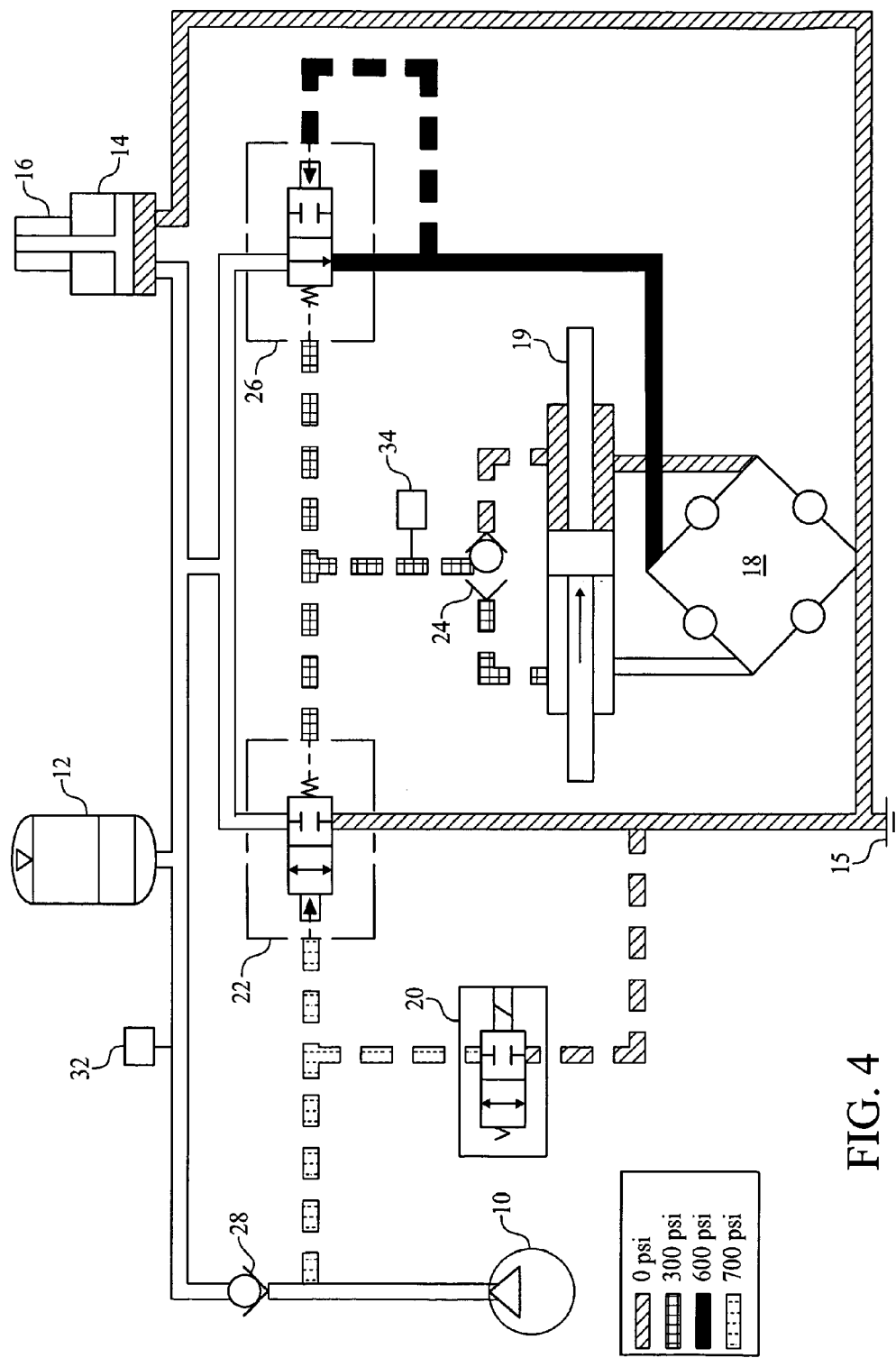
FIG. 4 shows the hydraulic circuit diagram in accordance with an embodiment of the invention, reflecting the onset of a steering event that triggers pump clutch engagement.

FIG. 4 shows the hydraulic circuit diagram of the same embodiment reflecting when a steering event triggers pump clutch engagement. As the driver continues a steering event (from FIG. 2) and applies more torque to the steering wheel to steer the vehicle, steering valve 18 opens further allowing more flow and increases pressure to the left side of the steering gear 19. Control valve 26 continues to maintain proportional pressure between the input side to steering valve 18 and reference pressure. Reference pressure is now above the trigger point for pressure switch 34 (ex. 300 psi), so the switch has just closed sending power to the pump clutch. Check valve 28 now opens as pump speed increases.

The control valve 26 continues to allow flow to the input side of steering valve 18 as the piston in the steering gear 19 moves right and has increased supply pressure (ex. 600 psi) proportionately above reference pressure (ex. 300 psi). Accumulator pressure has dropped (ex. 700 psi) and must have sufficient capacity to supply the input side of steering valve 18 (ex 600 psi) while the pump clutch is engaging. Depending on component selection and system layout of the hydraulic system, pressure switch 32 and 34 settings may need to be adjusted to ensure adequate pressure and flow can be provided by control valve 26 to the input side of the steering valve 18 while the pump clutch is engaging during rapid steering inputs.

Figure 5:
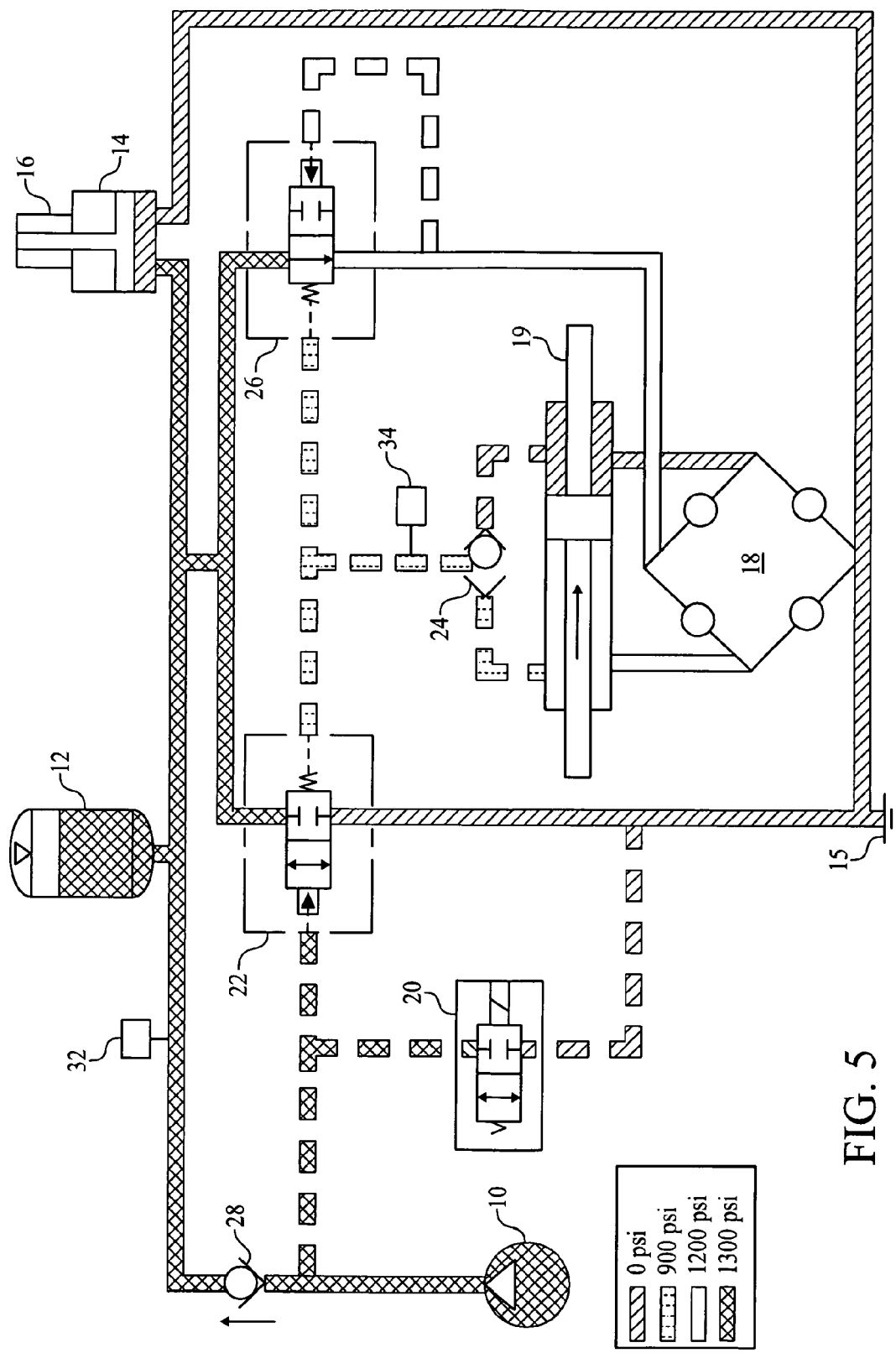
FIG. 5 shows the hydraulic circuit diagram in accordance with an embodiment of the invention, reflecting accumulator fully charged during a steering event.

FIG. 5 shows the hydraulic circuit diagram of the same embodiment reflecting recovery of accumulator pressure during a steering event with pump clutch engaged. Since pumps are sized to deliver enough flow at engine idle to meet worst case steering requirements, output flow from the pump/clutch assembly 10 will exceed flow required at gear 19 under most conditions. The excess flow will then begin building pressure in the accumulator circuit.

In this case, pressure in accumulator 12 has fully recovered to the max accumulator pressure setting. Control valve 26 continues to increase pressure (ex. 1200 psi) to the input side of steering valve 18 in proportion to reference pressure (ex. 900 psi). The piston in gear 19 continues to move to the right as the driver continues to turn the steering wheel and steering load and assist pressures are increasing. Pressure switch 34 and solenoid valve 20 are closed. Relief valve 22 remains closed because the pump supply pressure (ex. 1300 psi) is still below the proportional cracking pressure of relief valve 22 (ex. 1570 psi=1300 psi spring+0.3×900 psi reference pressure).

Figure 6:
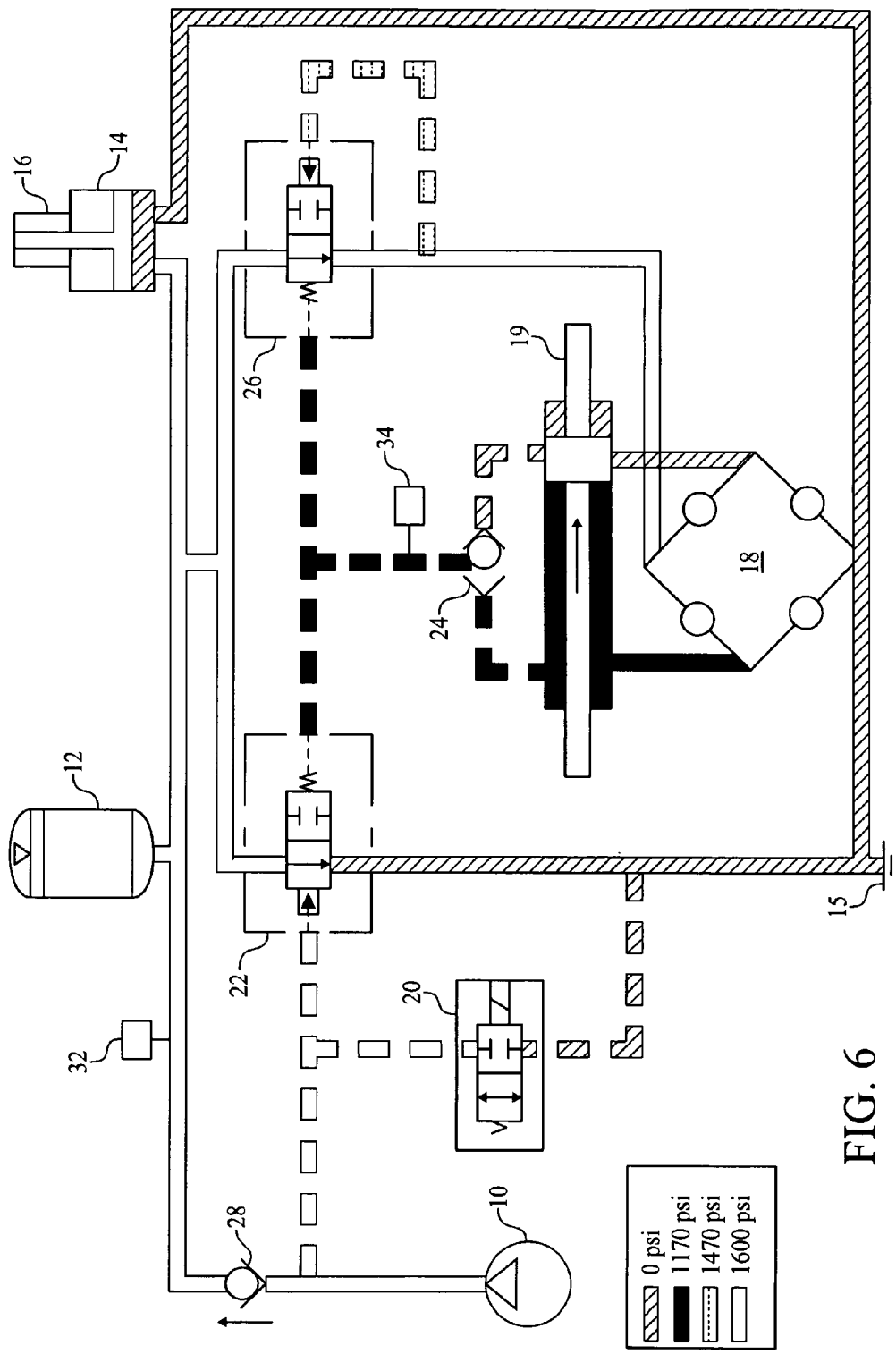
FIG. 6 shows the hydraulic circuit diagram in accordance with an embodiment of the invention, reflecting when the relief valve in the valve manifold begins to open during a steering event.

FIG. 6 shows the hydraulic circuit diagram of the same embodiment reflecting the relief valve in the manifold beginning to open during a steering event. As the steering event continues, control valve 26 continues to increase pressure (ex. 1470 psi) to the input side of steering valve 18 in proportion to reference pressure (ex. 1170 psi). Also, as the pump continues to run, check valve 28 is open, and the pressure continues to rise in the accumulator circuit. Eventually pump supply pressure reaches the cracking pressure of relief valve 22.

At this point, pump supply pressure (ex. 1600 psi) is nearly equal to the cracking pressure of relief valve 22 (ex. 1651 psi=1300 psi spring+0.3×1170 psi reference pressure). At this point, relief valve 22 begins to open allowing excess pump flow to return to reservoir 15, which is vented to atmosphere.

Figure 7:
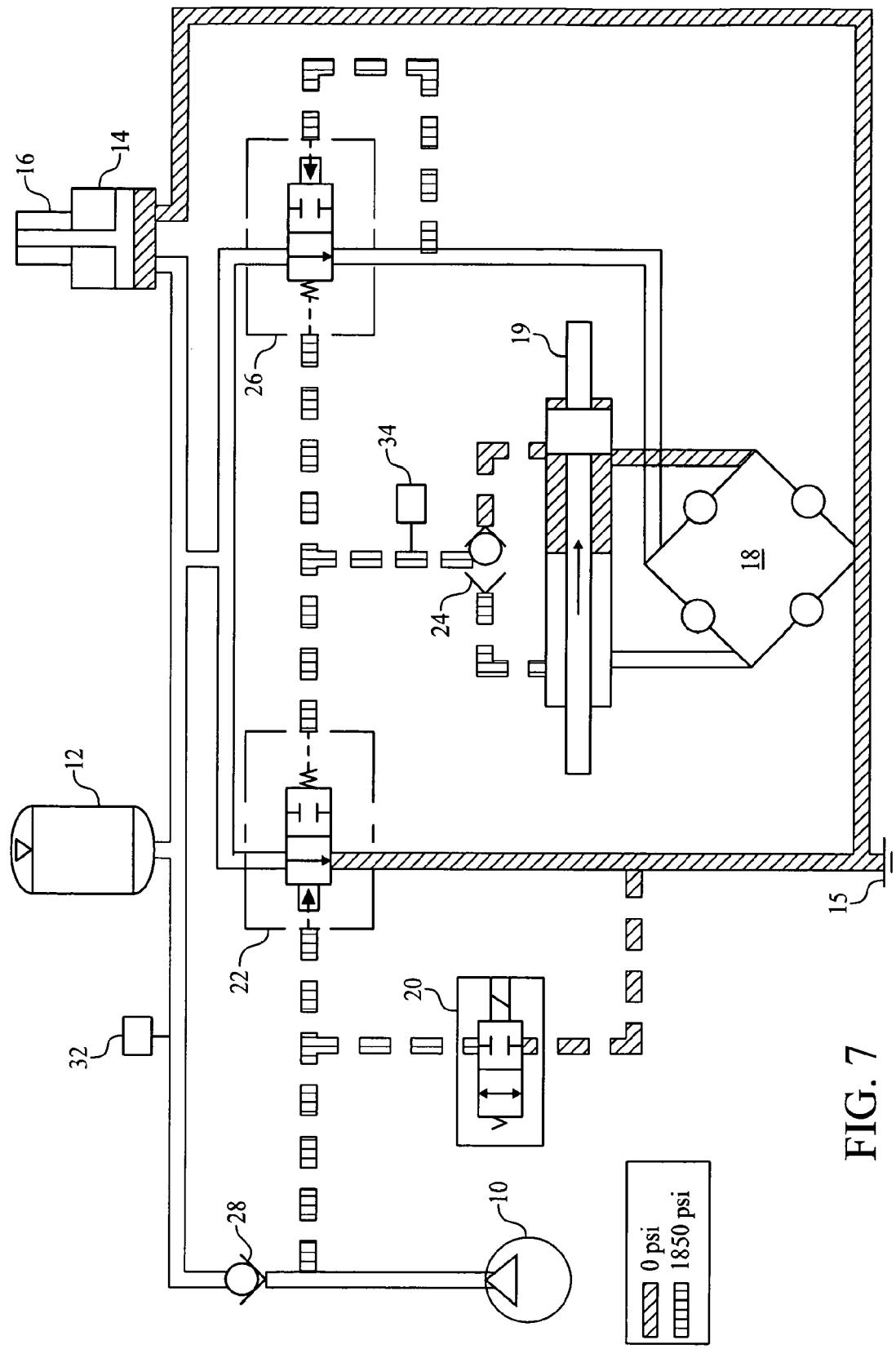
FIG. 7 shows the hydraulic circuit diagram in accordance with an embodiment of the invention, reflecting when the relief valve in the pump begins to open during a max load steering event.

FIG. 7 shows the hydraulic circuit diagram of the same embodiment reflecting the relief valve in the pump beginning to open during a maximum load steering event. Typically, maximum steering loads occur during a parking type maneuver when the steering wheel is turned all the way to the end of travel (steering stops).

In FIG. 6, relief valve 22 was beginning to open. However, as flow is directed to reservoir 15, control valve 26 continues to increase pressure (ex. 1850 psi) to the input side of steering valve 18 in proportion to reference pressure (ex. 1850 psi) as steering loads approach maximum levels. All pumps have internal relief valves to protect the hydraulic system. In the example shown in FIG. 8, the relief valve internal to the pump is set to open at 1850 psi and it begins to open redirecting pump flow within the pump itself. As the flow drops, check valve 28 closes. At this point, relief valve 22 is also beginning to open, because the proportional cracking pressure of relief valve 22 (ex. 1855 psi=1300 psi spring+0.3×1850 psi reference pressure). Relief valve 22 provides a redundant fail safe to protect the system should the pump relief fail.

Figure 8:
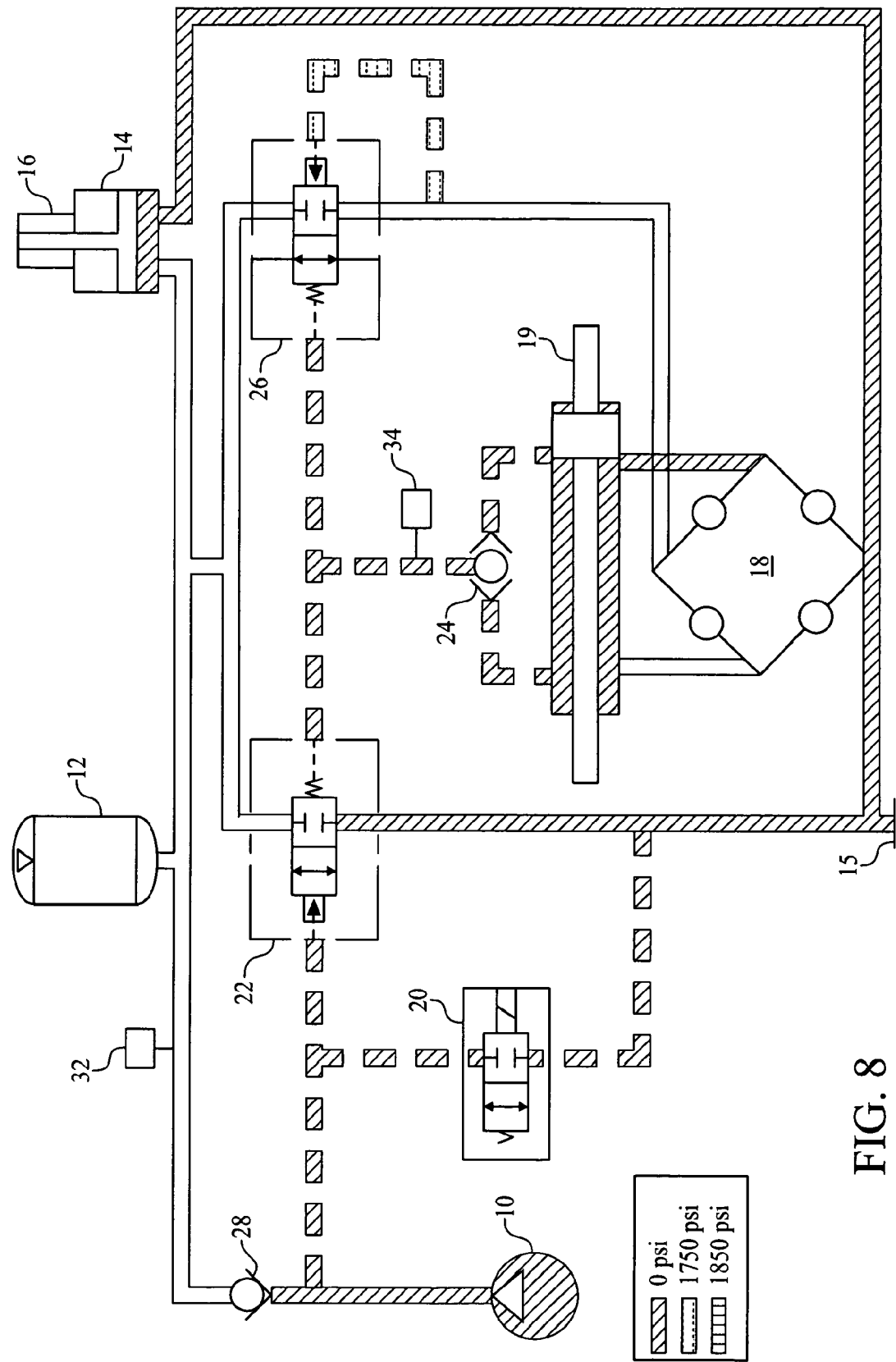
FIG. 8 shows the hydraulic circuit diagram in accordance with an embodiment of the invention, reflecting release of the steering wheel after a max load steering event.

FIG. 8 shows the hydraulic circuit diagram of the same embodiment reflecting release of steering wheel (steering load to zero) after a maximum load steering event. When the steering wheel is released, steering valve 18 returns to the on-center position. On center, steering valve 18 is designed to allow flow between left and right side gear ports in gear 19 and reservoir 15 through a return port in the valve. As such, when the steering wheel is released pressure on each side of the piston in the steering gear 19 along with reference pressure through shuttle valve 24 are relieved to atmospheric pressure. This drives control valve 26 closed since it is designed to allow flow only when supply pressure to input side of steering valve 18 is less than reference pressure (ex. 300 psi) while the pressure differential at this point is much higher (ex. 1750 psi). Relief valve 22 closes since the pressure in the pump supply is zero and well below the cracking pressure of relief valve 22 (ex. 1300 psi=1300 psi spring+ 0.3×0 psi reference pressure).

Figure 9:
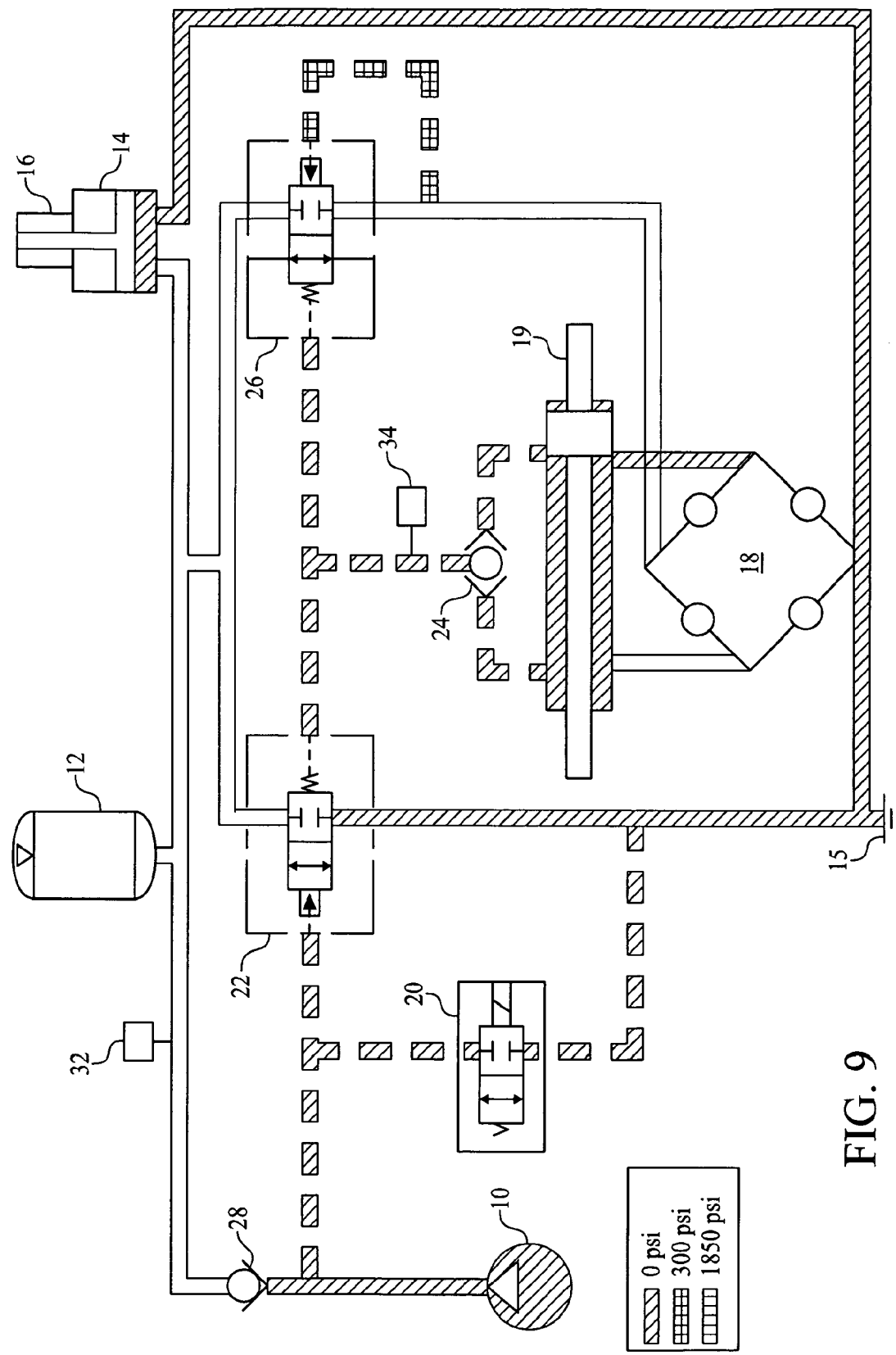
FIG. 9 shows the hydraulic circuit diagram in accordance with an embodiment of the invention, reflecting the pressure to the steering valve returning to set point through leakage at the steering valve.

FIG. 9 shows the hydraulic circuit diagram of the same embodiment showing pressure to steering valve 18 returning to the set point in control valve 26 (ex. 300 psi). This is accomplished by leakage through steering valve 18, which is on center.

Figure 10:
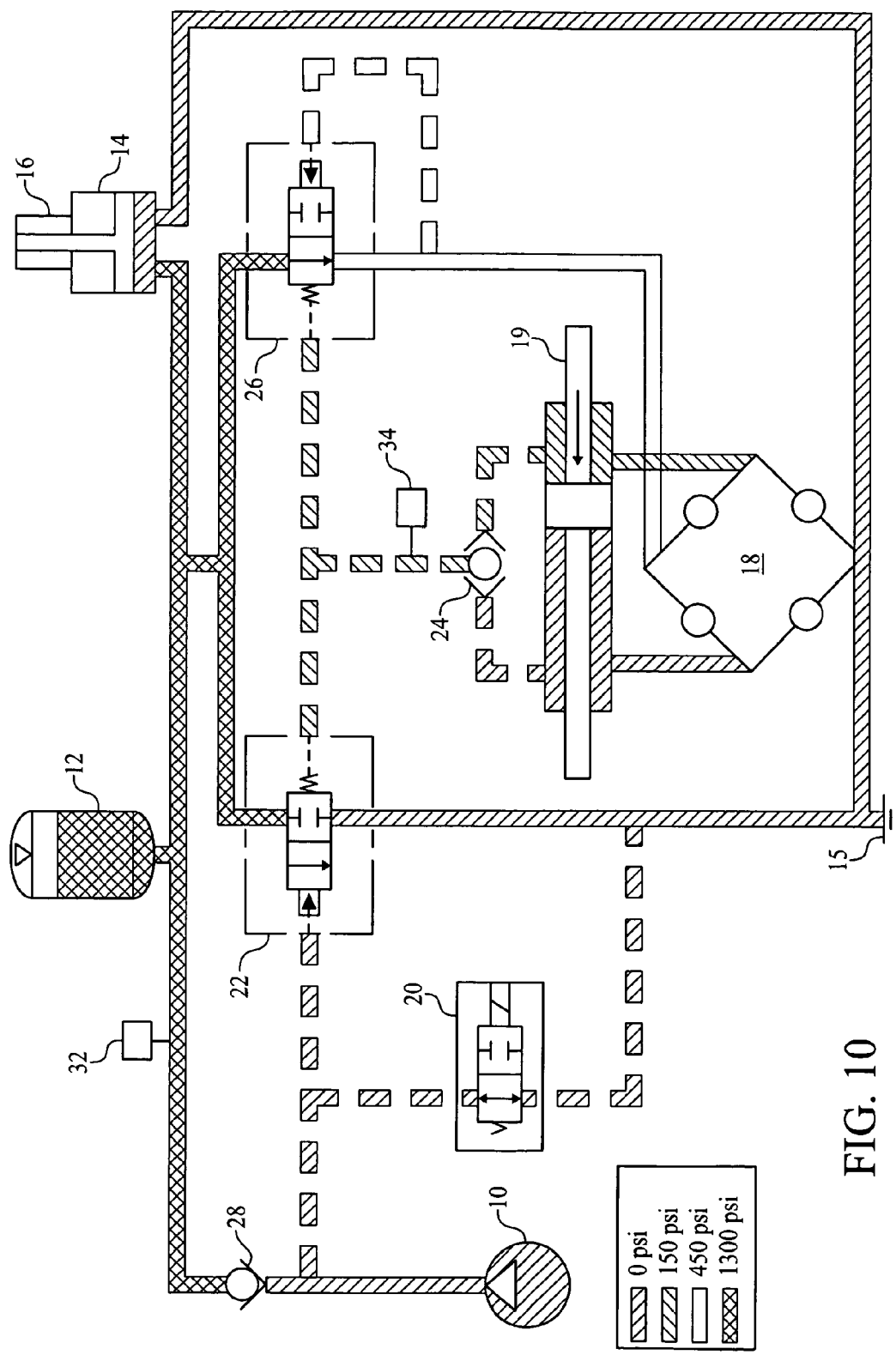
FIG. 10 shows the hydraulic circuit diagram in accordance with an embodiment of the invention, reflecting accumulator pressure drop as flow is supplied to gear.

FIG. 10 shows the hydraulic circuit diagram of the same embodiment reflecting a steering event in the opposite direction. In this example, the steering event is light similar to the event described in FIG. 3. Reference pressure (ex. 150 psi) is still below the trigger point for pressure switch 34 so the electrical circuit to the pump/clutch 10 remains open. Note, that control valve 26 has opened again to provide flow to gear 19 and maintain proportional pressure control to steering valve 18.

Figure 11:
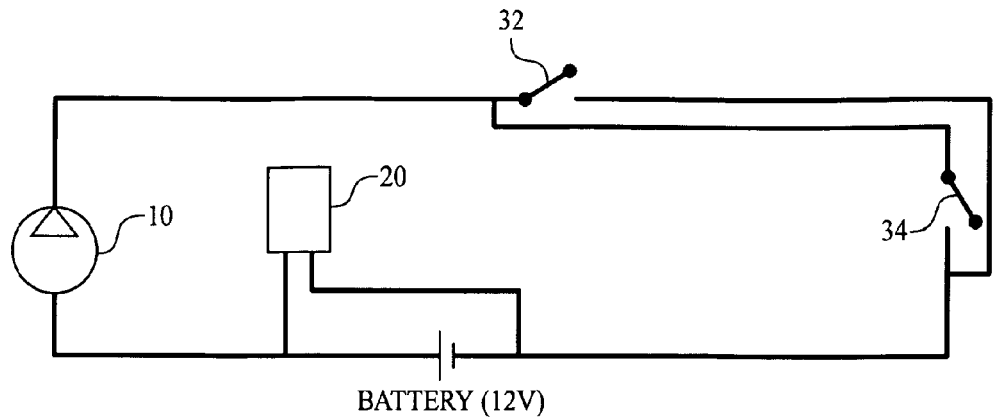
FIGS. 11-13 show the electrical circuit diagram in accordance with the same embodiment of the invention and operation during the hydraulic power steering system events described in FIGS. 1-10.
Figure 12:
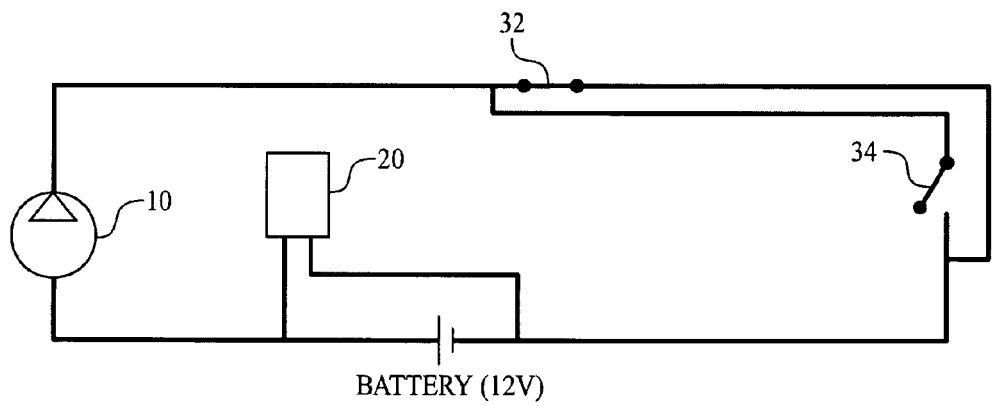
Figure 13:
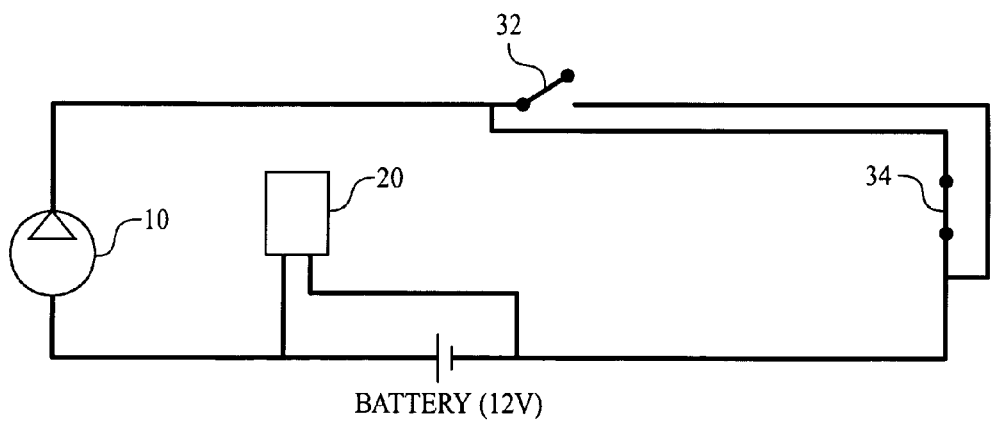

FIGS. 11-13 show three different modes for the electrical circuit for the same embodiment, which includes a battery that provides power to electrical components, pump/clutch assembly 10, solenoid valve 20, pressure switch 32, and pressure switch 34.

FIG. 11 reflects the standby mode where both pressure switch 32 and 34 are open. Since there is no path to ground for pump/clutch 10 and solenoid valve 20 there is no power to either component. The pump/clutch assembly 10 of FIGS. 1-10 is disengaged. FIG. 12 reflects the accumulator charge mode where pressure switch 32 is closed and pressure switch 34 is open. Since the pressure switches are wired in parallel, there is a path to ground providing power to pump/clutch 10 and solenoid valve 20. The pump/clutch assembly of FIG. 10 of FIGS. 1-10 is engaged. FIG. 13 reflects a steering event. The effect is the same as for FIG. 12, except that the pressure switch 32 is now open while switch 34 is closed. The pump/clutch assembly 10 of FIG. 1-10 is engaged.

Figure 14:
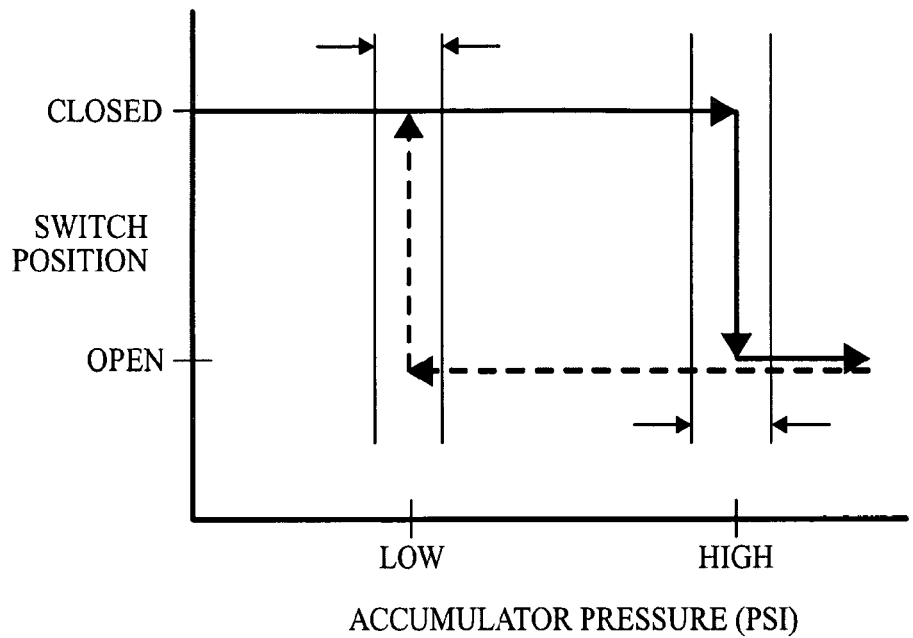
FIGS. 14-15 show the function of respective pressure switches as referenced in the hydraulic circuit diagrams shown in FIGS. 1-10.
Figure 15:
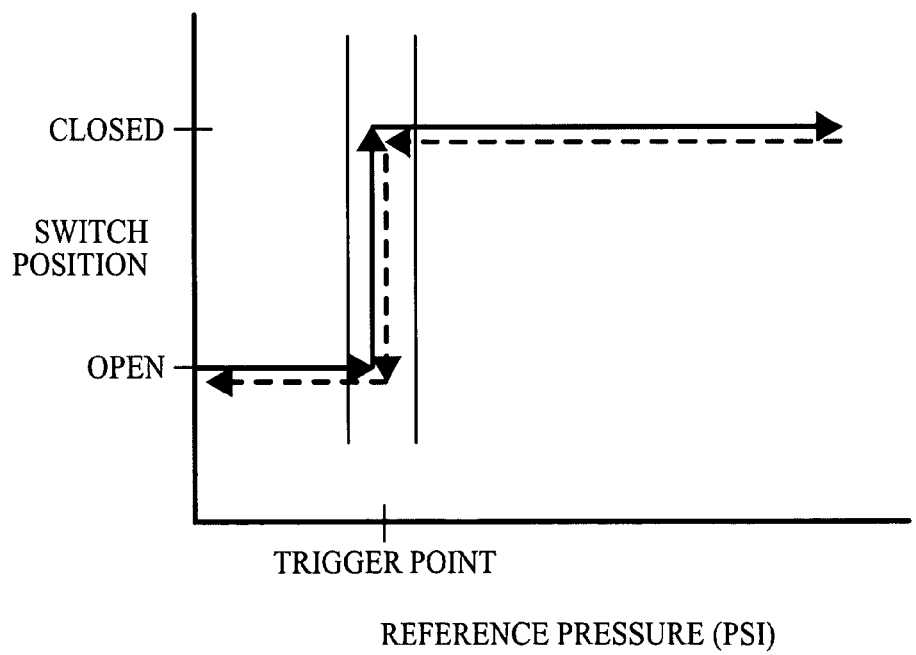

FIGS. 14-15 show the function of the pressure switch 32 and the pressure switch 34 for the same embodiment. FIG. 14 plots the function of switch position versus accumulator pressure for the pressure switch 32 while FIG. 15 plots the function of switch position versus reference pressure for the pressure switch 34. The hydraulic pressures at which the switches open and close vary depending on the application. The solid line arrows represent the response to increasing pressure, while the dashed line arrows represent the response to decreasing pressure.

Figure 16:
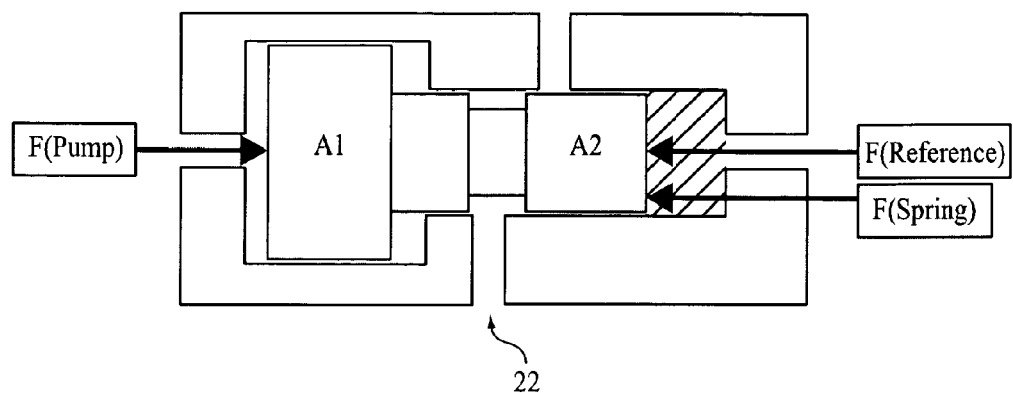
FIG. 16 shows a free body diagram of the relief valve of FIGS. 1-10.

FIGS. 16-20 show the relief valve 22 in various modes of operation. FIG. 16 shows the relief valve 22 in a free body diagram. Directional arrows are depicted to show the force direction for the F(pump), F(reference) and F(spring).

The force balance equations for the relief valve 22 are:
F(pump)=F(reference)+F(spring)
Since Pressure=Force/Area,
P(pump)*A1=P(reference)*A2+F(spring), with A1 & A2 defining the cross sectional areas at each end of the spool valve according to the relation A2=A1*0.3 so that:
P(pump)*A1=P(reference"A1*0.3+F(spring).
If the spring force is set so that F(spring)=P(accumulator fill setting)*A1, then P(pump)*A1=P(reference) *A1*0.3+P(accumulator fill setting)*A1
By dividing both sides by A1,
P(pump)=P(reference)*0.3+P(accumulator fill setting)

Figure 17:
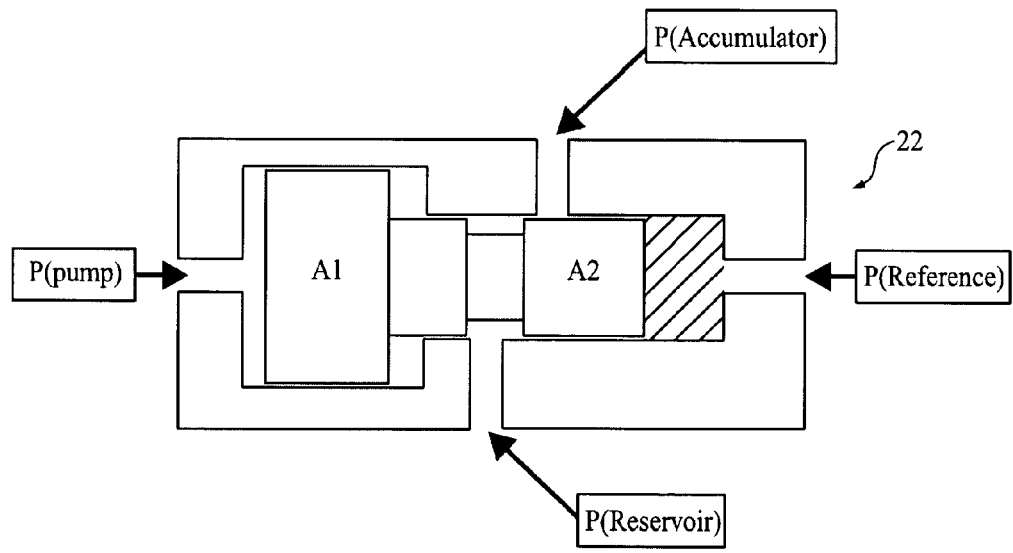
FIGS. 17-18 show the relief valve of FIG. 16 in operation for accumulator charging, respectively, at a beginning of the accumulator charging cycle and at an end of the accumulator charging cycle.
Figure 18:
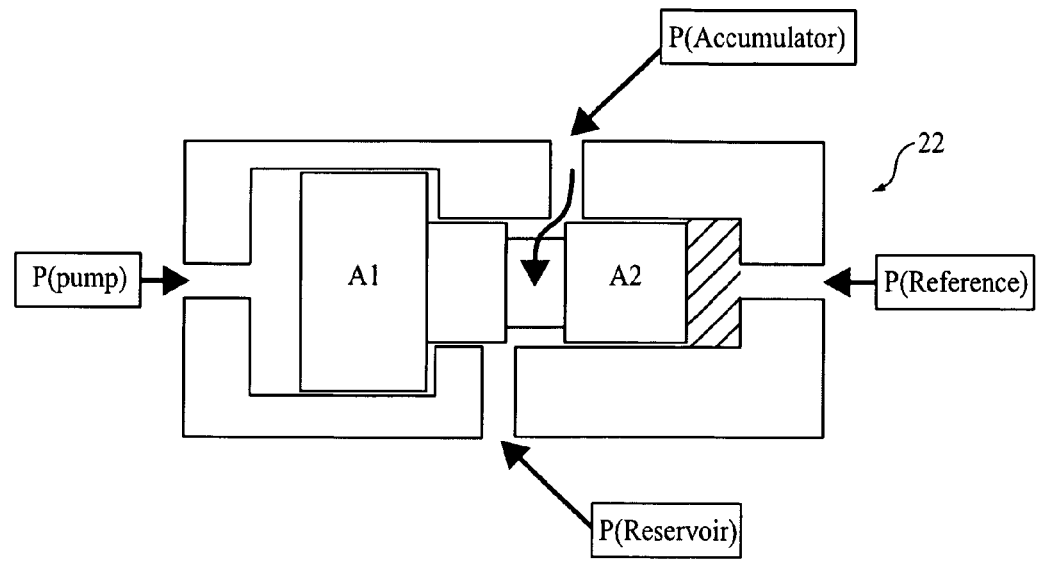

FIGS. 17 and 18 depict operation of the relief valve 22 during the charging cycle of the accumulator 12 of FIGS. 1-10. FIG. 17 represents the force balance on the relief spool during the beginning of the accumulator charging, while FIG. 18 represents the force balance on the relief spool during the end of the accumulator charging.

The force balance equations for the relief valve 22:
Since the pump & accumulator are in the same circuit, P(pump)=P(accumulator).
If there is no steering event during the accumulator charging, P(reference)=0.
Given the force balance equation:
P(pump)=P(reference)*0.3+P(accumulator fill setting), forces on the spool are balanced when P(pump)=P(accumulator fill setting). The valve will remain closed until P(pump)>P(accumulator fill setting).

Figure 19:
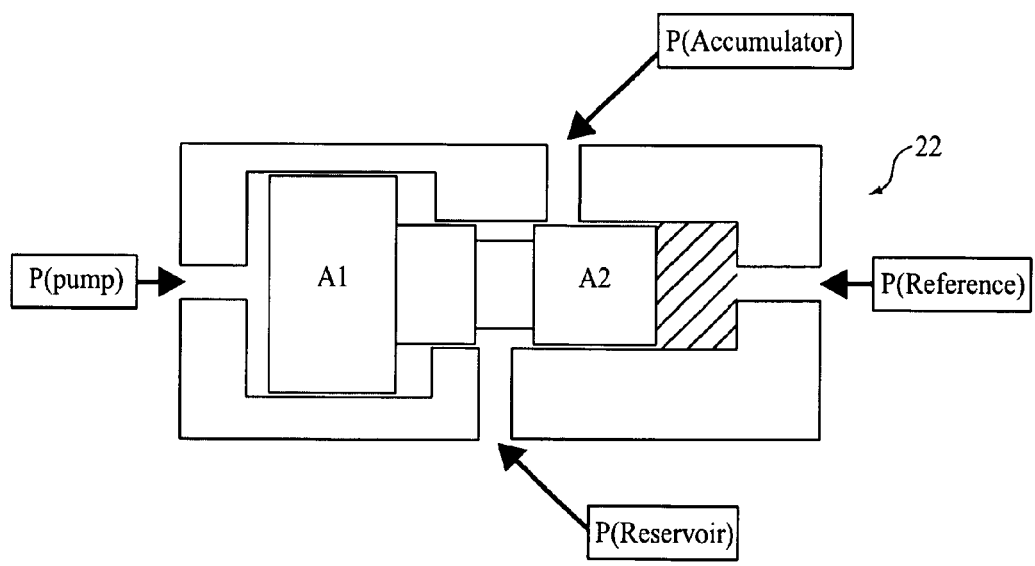
FIGS. 19-20 show the relief valve of FIG. 16 in operation for a steering event, respectively, closed and open.
Figure 20:
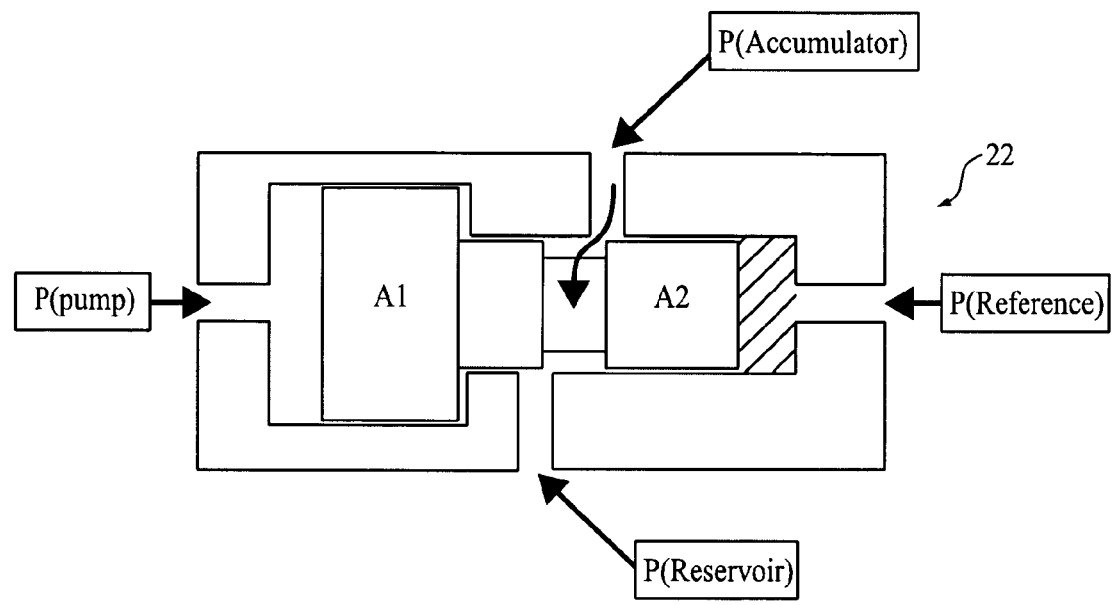

FIGS. 19 and 20 depict operation of the relief valve 22 during a steering event, with FIG. 19 showing the relief valve 22 in a closed position and FIG. 20 showing the relief valve 22 in an open position. When the pump clutch is engaged, the pump delivers constant flow to the system. Flow through a steering gear (with a closed center steering valve 18 of FIGS. 1-10) varies based on the steering wheel rate and gear size. The function of the relief valve is to dump excess flow from the pump to a reservoir. The relief valve uses the pressure differential between the pump {P(pump)} and gear {P(reference)} to control flow.

For example, the force balance on the relief spool during a steering event:
If P(accumulator fill setting)=1300 psi and P(reference) at a point in time=1170 psi, then the force balance on the relief spool is achieved when
P(pump)=1651 psi. That is:
P(pump)=P(reference)*0.3+P(accumulator fill setting)= 1170 psi*0.3+1300 psi=1651 psi
Consequently: if P(pump) rises above 1651 psi, the relief valve 22 opens, but if the P(pump) falls below 1651 psi, the relief valve 22 closes.

Figure 21:
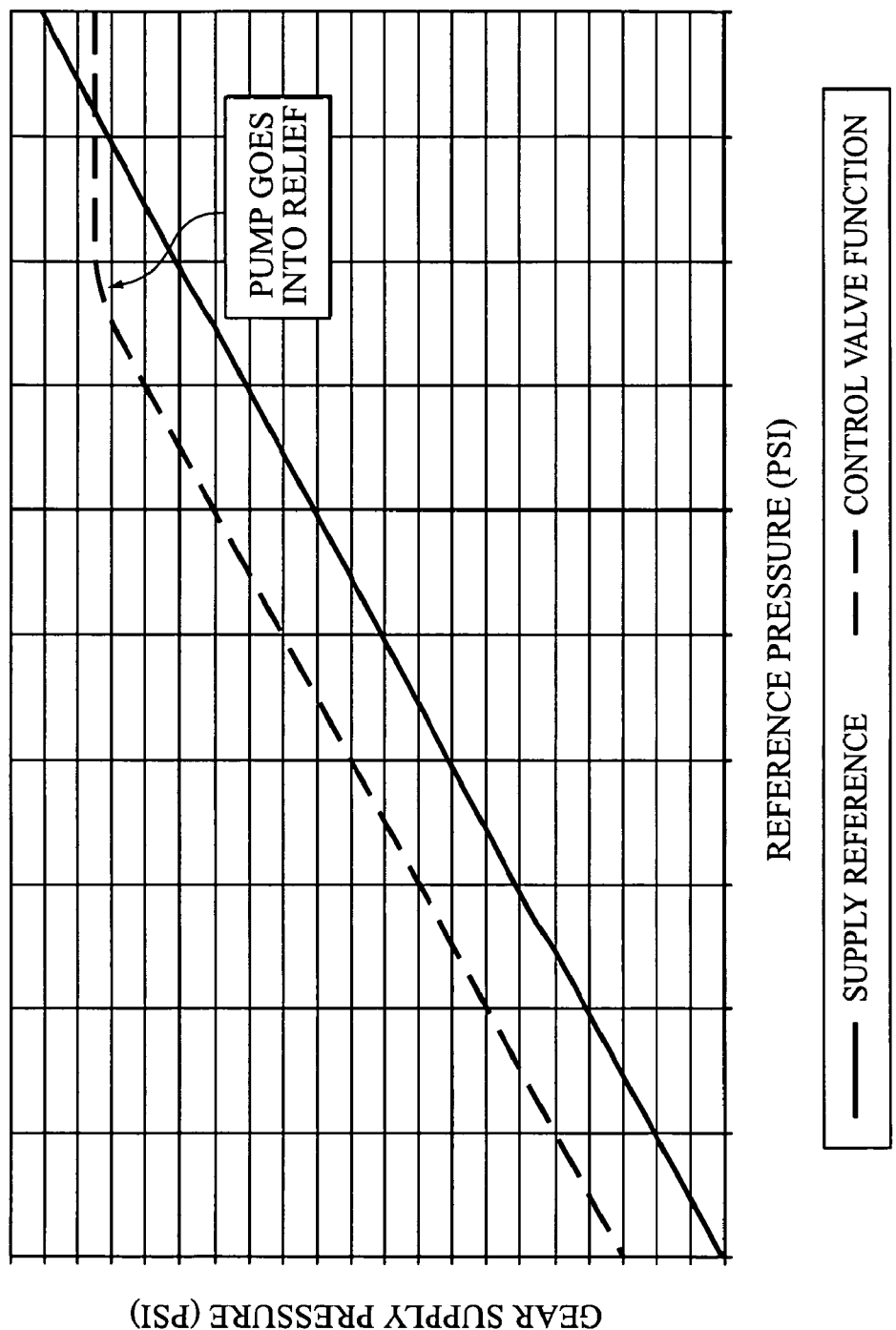
FIG. 21 shows a response curve describing the function of control valve referenced in the hydraulic circuit diagrams shown in FIGS. 1-10.

FIG. 21 shows a graphical illustration of the function of the control valve for the same embodiment. The graph includes two lines: A reference line showing when the supply pressure to the gear equals reference pressure and a line that represents the pressure provided by the control valve to the gear as a function of reference pressure. The line describing the control valve function also shows the condition when the pump goes into relief. Increasing the valve pressure setting above the gear reference pressure increases leakage through the steering valve, decreases the time between successive accumulator cycles, may improve system response and/or reduce catch, and forces the pump into relief at lower steering load conditions.

Figure 22:
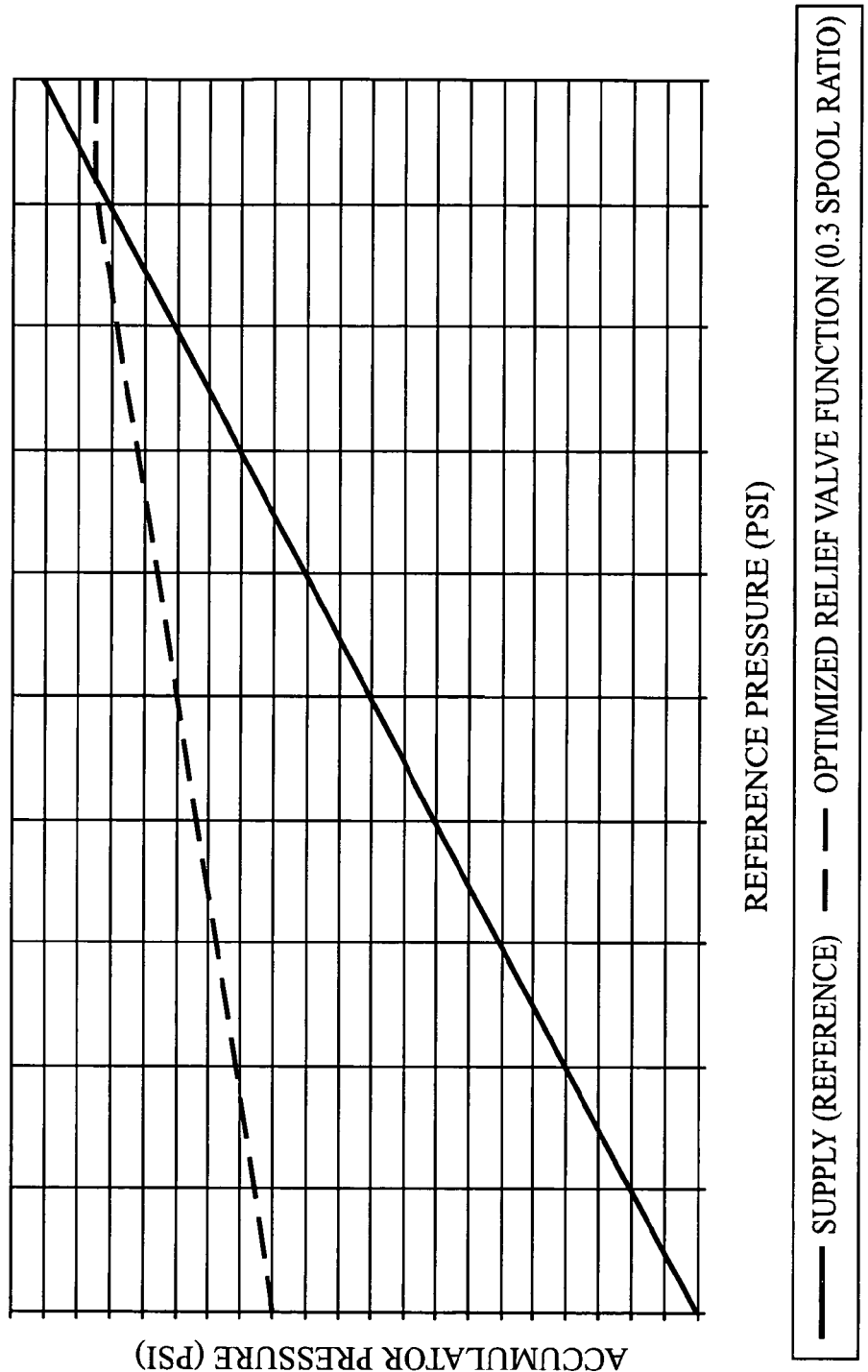
FIG. 22 shows a response curve describing the function of relief valve referenced in the hydraulic circuit diagrams shown in FIGS. 1-10.

FIG. 22 shows a graphical illustration of the function of the relief valve for the same embodiment. The graph includes two lines: A reference line showing when accumulator pressure equals reference pressure and a line that represents the pressure provided by the relief valve on the accumulator circuit as a function of reference pressure. Decreasing the area of the valve spool exposed to the reference pressure relative to the spool area exposed to the accumulator pressure prevents the pump from going into relief too early, allows higher accumulator storage pressure settings than would otherwise be the case, increases the time between accumulator cycles when there is no steering demand, reduces energy consumption.

While the foregoing description and drawings represent the preferred embodiments of the present invention, various changes and modifications may be made without departing from the scope of the present invention.

What is claimed is:

1. A method of hydraulic power steering, comprising the steps of monitoring pressure on each side of a piston in a steering gear; feeding a higher of the two pressures to a reference pressure circuit; sensing a drop in pressure in the reference pressure circuit to a low pressure limit and sensing a rise in pressure in the reference pressure circuit to a high pressure limit, closing a pressure switch upon the sensing of the drop in pressure to the low pressure limit to enable power to reach a clutch that engages a pump to trigger pumping by the pump, opening the pressure switch upon the sensing of the rise in pressure in the reference pressure circuit to a high pressure limit to stop the power from reaching the clutch and thereby disengage the clutch from the pump to stop the pumping by the pump; maintaining proportional pressure control between an input side of a steering valve in a valve manifold and the steering gear with a control valve in a valve manifold by maintaining a pressure differential between the input side of the steering valve and the steering gear during at least one event.

2. The method of claim 1, further comprising selecting the event from the group consisting of running the pump to fully charge an accumulator, idling the pump after fully charging the accumulator, discharging pressure from the fully charged accumulator at an onset of a steering event having a demand for steering load, recovering the discharged pressure of the accumulator by running the pump after turning on the pump at the onset of the steering event, and opening a relief valve in the valve manifold during the steering event.

3. The method of claim 2, wherein the running of the pump occurs as pressure within the accumulator falls below a low pressure limit, idling of the pump occurs as the pressure within the accumulator exceeds a high pressure limit, the low pressure limit being lower than the high pressure limit.

4. The method of claim 2, wherein the discharging of the accumulator at the onset of the steering event prevents a lag in response to satisfying the demand for steering load, the lag otherwise arising because of a time delay before the pump, after being turned on at the onset of the steering event, reaches capacity to satisfy the demand for steering load.

5. The method of claim 2, further comprising idling the pump during times when there is no demand for steering load from a steering wheel and no demand for braking load from a hydra boost braking system downstream of the accumulator.

6. The method of claim 2, the steering valve returning to a center position upon release of a steering wheel that causes the steering load to be zero, the center position allowing flow between opposite gear ports in the steering gear and a reservoir through a return port in the steering valve so that pressure on each side of the piston in the steering gear along with reference pressure through the shuttle valve are relieved to atmospheric pressure.

7. The method of claim 6, further comprising leakage through the steering valve that is in the center position, returning pressure to the steering valve to set point in the control valve because of the leakage, the set point being the amount of the pressure differential.

8. The method of claim 1, further comprising opening the steering valve in correspondence with turning of the steering gear and closing upon cessation of the turning of the steering gear.

9. The method of claim 1, wherein the monitoring of the two pressures one on each side of a piston in the steering gear takes place with a shuttle valve that provides a higher of the two pressures to the reference pressure circuit.

10. The method of claim 1, wherein the pump has an internal relief valve that opens during a maximum load steering event that arises during a parking maneuver when a steering wheel is fully turned to an end of travel so that pump flow redirects within the pump itself to cause a reduction in flow leaving the pump, closing a check valve in response to the reduction in flow to prevent reverse flow.

11. A method of hydraulic power steering, comprising the steps of monitoring pressure on each side of a piston in a steering gear; feeding a higher of the two pressures to a reference pressure circuit; sensing a drop in pressure in the reference pressure circuit to a low pressure limit and sensing a rise in pressure in the reference pressure circuit to a high pressure limit, closing a pressure switch upon the sensing of the drop in pressure to the low pressure limit to enable power to reach a clutch that engages a pump to trigger pumping by the pump, opening the pressure switch upon the sensing of the rise in pressure in the reference pressure circuit to a high pressure limit to stop the power from reaching the clutch and thereby disengage the clutch from the pump to stop the pumping by the pump; beginning to open a relief valve as supply pressure to the pump exceeds pressure required to overcome a spring setting internal to the relief valve plus a secondary opposing pressure from an opposite end of the relief valve that is ported to the reference pressure circuit.

12. The method of claim 11, further comprising exposing an area of an internal spool valve to reference pressure that is 30% smaller than an area of the spool valve that is exposed to the supply pressure to the pump, which reduces a contribution of a reference pressure in the reference pressure circuit on a spool and allows the relief valve to begin relieving some flow to the pump back to a reservoir as the reference pressure increases, which furthers balancing the supply pressure to the pump with the demand as determined by the reference pressure and keeps the pump from going into relief prematurely during conditions of a steering load that are moderate to high, the high being higher than at an onset of a steering event that is light.

13. An apparatus suited for hydraulic power steering, comprising: a monitor of pressure on each side of a piston in a steering gear; a mechanism to feed a higher of the two pressures to a reference pressure circuit; a sensor equipped to sense a drop in pressure in the reference pressure circuit to a low pressure limit and to sense a rise in pressure in the reference pressure circuit to a high pressure limit; a pressure switch configured and arranged to close upon the sensor sensing the drop in pressure to the low pressure limit to enable power to reach a clutch that engages a pump to trigger pumping by the pump, the pressure switch being configured and arranged to open upon the sensor sensing the rise in pressure in the reference pressure circuit to a high pressure limit to stop the power from reaching the clutch and thereby disengage the clutch from the pump to stop the pumping by the pump; and means for maintaining proportional pressure control between an input side of a steering valve in a valve manifold and the steering gear with a control valve in a valve manifold by maintaining a pressure differential between the input side of the steering valve and the steering gear during at least one event.

14. The apparatus of claim 13, further comprising the pump, an accumulator upstream of the pump, a steering valve in a valve manifold, a relief valve in the valve manifold, the valve manifold being upstream of the pump, a steering gear operative to turn the steering valve.

15. The apparatus of claim 14, wherein the event is selected from the group consisting of running the pump to fully charge the accumulator, idling the pump after fully charging the accumulator, discharging pressure from the fully charged accumulator at an onset of a steering event having a demand for steering load, recovering the discharged pressure of the accumulator by running the pump after turning on the pump at the onset of the steering event, and opening the relief valve in the valve manifold during the steering event.

16. The apparatus of claim 14, further comprising a hydra boost braking system downstream of the accumulator, the pump being directed to idle while there is no demand for the steering load from a steering wheel and no demand for a braking load by the hydra boost braking system.

17. The apparatus of claim 14, wherein the steering valve returns to a center position upon release of a steering wheel that causes a steering load to be zero, the center position allowing flow between opposite gear ports in the steering gear and a reservoir through a return port in the steering valve so that pressure on each side of the piston in the steering gear along with reference pressure through the shuttle valve are relieved to atmospheric pressure.

18. The apparatus of claim 17, wherein the steering valve is configured to allow leakage through the steering valve as the steering valve is in the center position, the control valve being configured to return pressure to set point because of the leakage, the set point being the amount of the pressure differential.

19. The apparatus of claim 13, wherein the event is selected from the group consisting of running the pump to fully charge the accumulator, idling the pump after fully charging the accumulator, discharging pressure from the fully charged accumulator at an onset of a steering event having a demand for steering load, recovering the discharged pressure of the accumulator by running the pump after turning on the pump at the onset of the steering event, and opening the relief valve in the valve manifold during the steering event.

20. The apparatus of claim 19, wherein the accumulator is configured to discharge at the onset of the steering event to prevent a lag in response to satisfying the demand for steering load, the lag otherwise arising because of a time delay before the pump, after being turned on at the onset of the steering event, reaches capacity to satisfy the demand for steering load.

21. The apparatus of claim 13, wherein the pressure switch is configured and arranged to respond to pressure within the accumulator falling below a low pressure limit to trigger running of the pump, the pressure switch being configured and arranged to respond to pressure within the accumulator exceeding a high pressure limit to trigger idling of the pump, the low pressure limit being lower than the high pressure limit.

22. The apparatus of claim 13, wherein the steering valve is arranged to open in correspondence with turning of the steering gear and to close upon cessation of the turning.

23. The apparatus of claim 13, further comprising a shuttle valve configured as the monitor of the two pressures one on each side of a piston in the steering gear and to provide a higher of the two pressures to the reference pressure circuit.

24. The apparatus of claim 13, further comprising a relief valve that begins to open as supply pressure to the pump exceeds pressure required to overcome a spring setting internal to the relief valve plus a secondary opposing pressure from an opposite end of the relief valve that is ported to the reference pressure circuit.

25. The apparatus of claim 24, further comprising an area of an internal spool valve being exposed to reference pressure of the reference pressure circuit that is 30% smaller than an area of the spool valve that is exposed to the supply pressure to the pump, which reduces a contribution of the reference pressure on a spool and allows the relief valve to begin relieving some flow to the pump back to a reservoir as the reference pressure increases, which furthers balancing pump supply with the demand as determined by the reference pressure and keeps the pump from going into relief prematurely during conditions of the steering load that are moderate to high, which is higher than that at the onset of the steering event that is light.

26. The apparatus of claim 13, wherein the pump has an internal relief valve that opens during a maximum load steering event that arises during a parking maneuver when a steering wheel is fully turned to an end of travel so that pump flow redirects within the pump itself to cause a reduction of flow leaving the pump; a check valve configured to close in response to the reduction of flow to prevent reverse flow.

* * * * *